No. 842,479. PATENTED JAN. 29, 1907.
G. A. LUTZ & C. C. SIBLEY.
MEANS FOR SUPPORTING RECEPTACLES AND THE LIKE.
APPLICATION FILED OCT. 26, 1905.
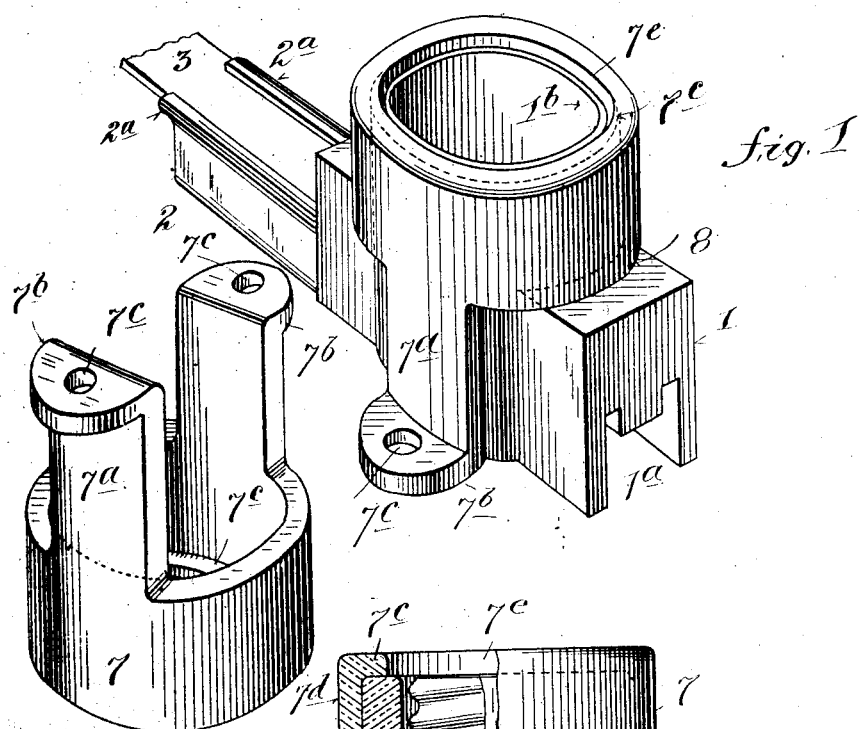
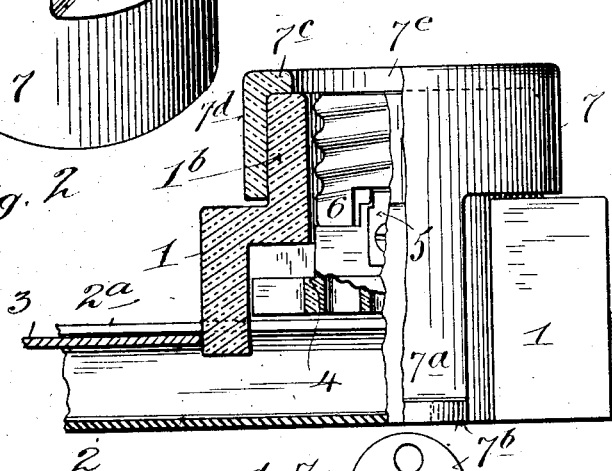
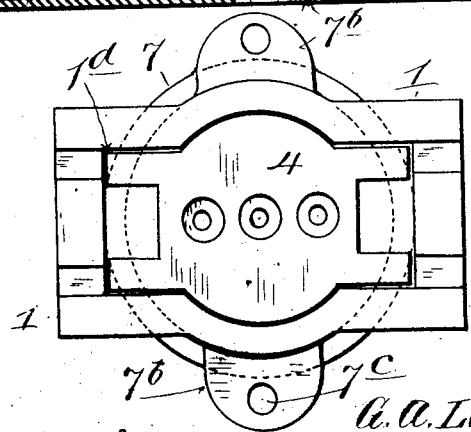
Witnesses
Inventors
G. A. Lutz & C. C. Sibley
By their Attorney

UNITED STATES PATENT OFFICE.

GEORGE A. LUTZ, OF NEW YORK, N. Y., AND CLARENCE C. SIBLEY, OF PERTH AMBOY, NEW JERSEY.

MEANS FOR SUPPORTING RECEPTACLES AND THE LIKE.

No. 842,479.  Specification of Letters Patent.  Patented Jan. 29, 1907.

Application filed October 26, 1905. Serial No. 284,560.

*To all whom it may concern:*

Be it known that we, GEORGE A. LUTZ and CLARENCE C. SIBLEY, citizens of the United States, residing, respectively, in New York city, borough of Brooklyn, New York, and Perth Amboy, Middlesex county, New Jersey, have invented certain new and useful Improvements in Means for Supporting Receptacles and the Like, of which the following is a specification.

The invention has for its object to provide simple and efficient means for detachably holding receptacles, rosettes, and analogous devices upon or in connection with conduits for electric conductors; and the invention comprises a frame or the like adapted to fit over a receptacle, cap, rosette, or the like and to be attached to a wall, ceiling, or other support, the frame having a member passing along the sides of the receptacle to fit against the support.

The invention also comprises the novel details of improvement that will be more fully hereinafter set forth and then pointed out in the claims.

Reference is to be had to the accompanying drawings, forming part hereof, wherein—

Figure 1 is a persepctive view of a receptacle and conduit, showing the improved means for holding the same against a support. Fig. 2 is a perspective view of the holding-frame. Fig. 3 is a side view, partly in section, of the device shown in Fig. 1; and Fig. 4 is an inverted plan view of the device illustrated in Fig. 3.

In the accompanying drawings, in which similar numerals of reference indicate corresponding parts in the several views, the numeral 1 indicates a receptacle, cap, or equivalent device or fitting adapted to be mounted upon or used with a conduit 2 for electric wires. In the drawings the receptacle or cap 1 is shown provided with a gain or recess 1ª, opening through the under side and the ends to receive the conduit 2, whereby the receptacle or cap 1 is mounted over said conduit, and the conduit shown is of the class having one side open and provided with a cover 3, received in grooved portions 2ª of the conduit.

At 4 is a base within the cap 1 over the conduit 2, which base may be provided with suitable electrical fittings, contacts, &c., 5 6 in well-known manner.

The parts 1, 4, 5, and 6 represent a receptacle of any general or approved form or construction to be used in connection with conduits, and the parts 1 and 4 may be of insulating material, such as porcelain.

At 7 is a frame or band provided with extensions 7ª, adapted to fit over and bear upon cap 1, the extensions 7ª passing along the sides of the cap, and said extensions are provided with outturned lugs or the like 7ᵇ, provided with apertures 7ᶜ to receive screws or the like for firmly holding the frame against a ceiling, wall, or other support. The frame 7 or its tubular or hollow portion 7ᵈ may have an inner flange 7ᵉ, that alines with the hollow extension 1ᵇ of the cap 1 to bear thereon, or the under part of frame 1 may bear upon the cap 1, as at 8.

In assembling the parts the base and cap are placed upon or over the conduit and the frame 7 is placed over the cap, so that the lugs 7ᵇ will bear against a ceiling, wall, or support, and then said lugs are secured or nailed to the support, and thereby the frame not only serves in holding the receptacle upon the conduit, but assists in holding the conduit against the support. By making the frame 7 in substantially tubular form to fit over the tubular extensions 1ᵇ of the receptacle or cap 1 the frame will keep the cap from movement along the conduit.

While the improvements are illustrated in connection with a receptacle having a cap and base, it will be understood that the invention is applicable as well to rosettes, outlet or junction boxes, and analagous electrical devices to be fitted upon or connected with conduits for electric conductors for making branch connections and similar purposes.

Having now described our invention, what we claim is—

1. In a device of the character described the combination of a cap, and a base having electrical fittings within the cap, with a frame fitting upon the cap and provided with means for attachment to a support independent of a conduit to hold the cap in place.

2. In a device of the character described, the combination of a conduit with a cap fitting thereover, and a frame fitting over the cap and provided with means for attachment to a support independent of a conduit for holding the cap upon the conduit.

3. A device of the character described comprising a receptacle having a base and a cap, the base having electrical fittings within the cap, and a frame fitting over the cap and provided with means for attachment to a support.

4. In a device of the character described the combination of a cap, with a frame having a hollow portion fitting around an extended part of the cap, said frame having extended portions passing along the cap and provided with means for attachment to a support.

5. A device of the character described comprising a cap having a hollow extension, and a frame having a bore receiving the extended part of the cap and provided with extensions passing along the sides of the cap, said extensions having means for attachment to a support.

6. A device of the character described comprising a cap, a frame having a bore receiving a portion of the cap, said bore having an inward flange bearing upon the cap, and means for attaching the frame to a support.

7. In a device of the character described the combination of a base, a cap provided with a hollow extension, and a frame having a bore receiving said extension, said frame having extended portions and provided with means for attachment to a support.

8. In a device of the character described the combination of a base, a cap having a hollow extension, a frame having a bore receiving said extension and provided with a flange bearing against said extension, said frame having extended portions, and means for attaching the frame to a support.

GEO. A. LUTZ,
CLARENCE C. SIBLEY.

Witnesses:
T. F. BOURNE,
M. HOLLINGSHEAD.